UNITED STATES PATENT OFFICE.

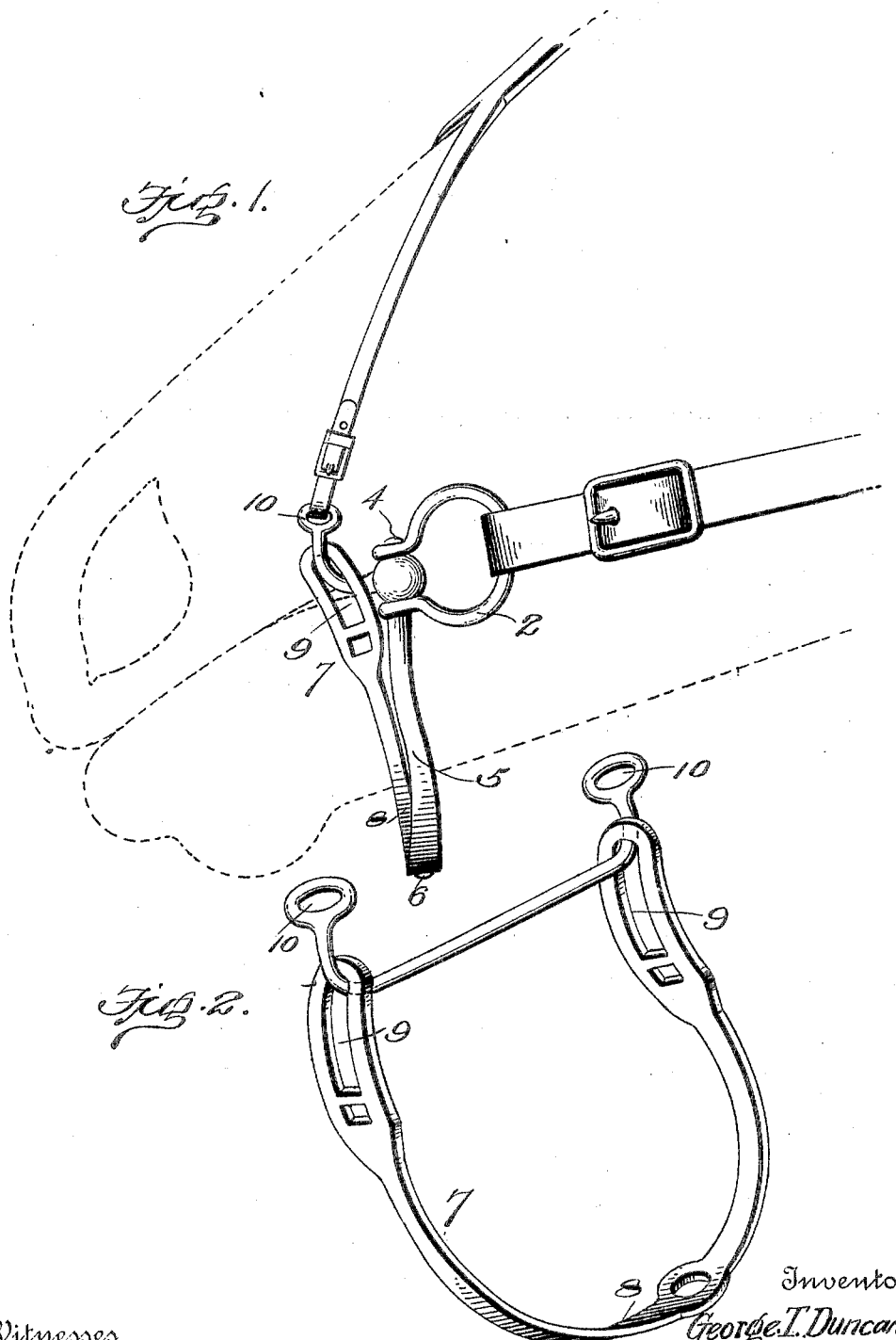

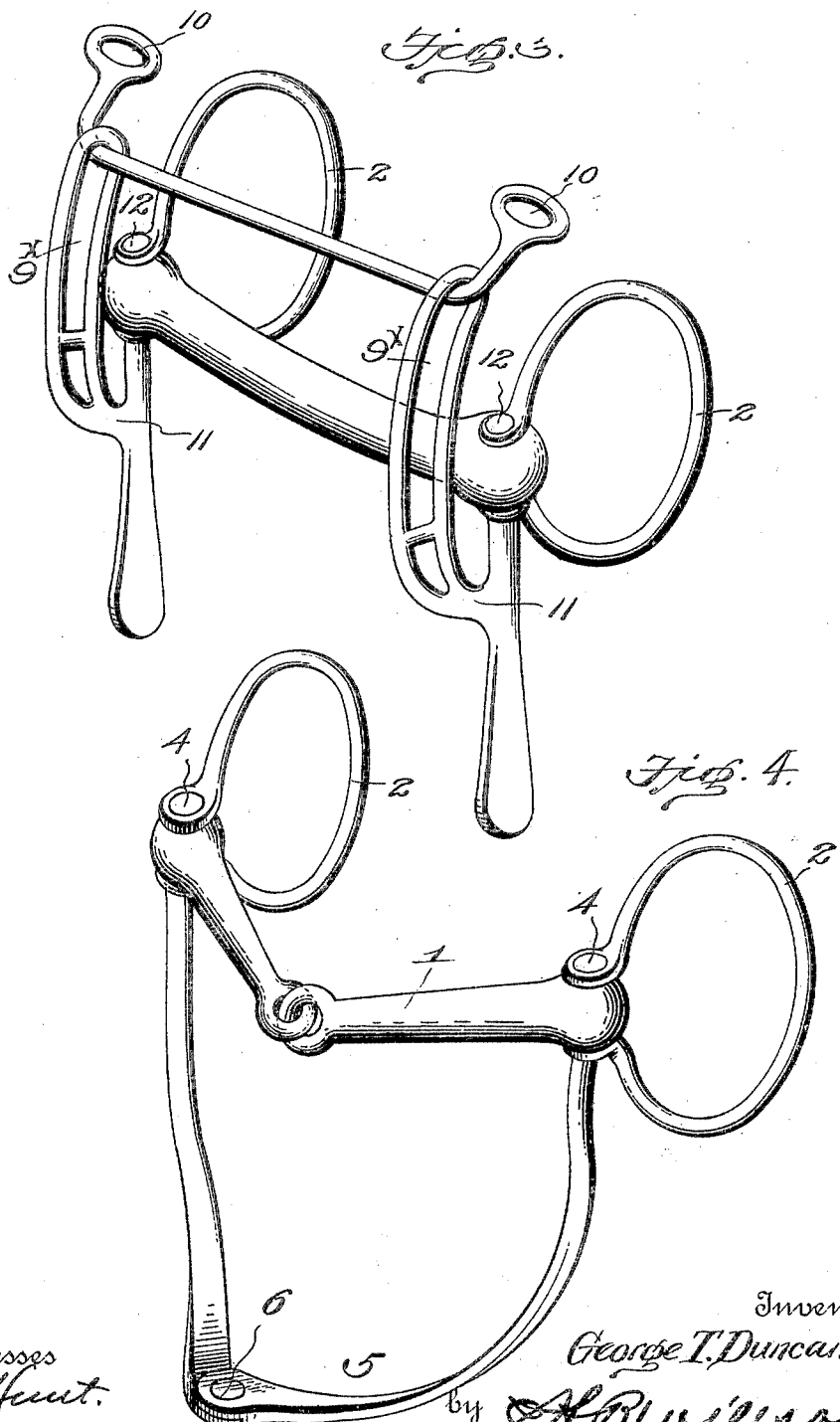

GEORGE T. DUNCAN, SR., OF SEATTLE, WASHINGTON.

DRIVING-BIT.

No. 802,375.　　　　Specification of Letters Patent.　　　　Patented Oct. 24, 1905.

Application filed April 6, 1905. Serial No. 254,204.

*To all whom it may concern:*

Be it known that I, GEORGE T. DUNCAN, Sr., a citizen of the United States, residing at Seattle, in the county of King and State of Washington, have invented certain new and useful Improvements in Driving-Bits; and I do declare the following to be a full, clear, and exact description of the invention, such as will enable others skilled in the art to which it appertains to make and use the same.

This invention relates to driving-bits; and one of the principal objects of the same is to provide an overdraw-check attachment to ordinary bridle-bits which will not irritate, pinch, or extend the jaws of the horse and which will place the horse under complete control of the driver.

Another object is to provide an overdraw-check guard for the check-bit which may be pivotally connected to a hinged snaffle-bar which curves under the lower jaw of the animal, thus providing a yielding support for the check-bit which will hold it in the required position for use, said guard permitting a limited movement of the check-bit and providing a humane controlling device for animals.

These and other objects are attained by means of the construction illustrated in the accompanying drawings, in which—

Figure 1 is a side elevation of a bridle-bit made in accordance with my invention and showing in dotted lines the position which the same occupies in the mouth of a horse. Fig. 2 is a perspective view of the check-guard and overdraw-check bit of the type adapted to be used with a jointed mouth-bit. Fig. 3 is a similar view of the overdraw-check guard and overdraw-bit when used with a modified form of stiff mouth-bit, and Fig. 4 is a perspective view of a bit having a curved and hinged snaffle-bar.

Referring to the drawings for a more particular description of my invention, the numeral 1 designates a jointed mouthpiece, and 2 designates the rein-rings therefor. The rein-rings and mouth-bit are pivoted together by means of the reduced upper ends 4 of a curved snaffle-bar 5, the snaffle-bar meeting at the center under the lower jaw of the horse and being pivoted or hinged together by means of a rivet 6, the overlapping ends of the snaffle members being recessed to form a smooth hinge-joint.

The overdraw-check guard 7 consists of a curved chin-bar portion 8, which is pivoted upon the rivet 6, which connects the snaffle members. The upper ends of the check-guard are provided with curved slots 9, and the overdraw-check bit passes through said slots and is provided with the usual loops 10 for the overdraw ends.

My overdraw-check guard may be applied to any form of bit and, as shown in Fig. 3, the check-guard is formed upon cheek-pieces 11, the upper end of said cheek-pieces each having a shank 12, which passes through the stiff mouth-bit and connects the rein-ring thereto. The cheek-pieces 11 are each provided with a curved slot $9^\times$, through which the overdraw-check bit passes. Similar modifications may be made to provide means for connecting my overdraw-check guard to bits of various types.

From the foregoing it will be obvious that my overdraw-check, when connected to either a snaffle-bit or to a stiff-mouthpiece bit, is humane in its action, does not force the jaws of the horse open to an extent to interfere with proper breathing, will not pinch the sides of the mouth of the horse, and will not chafe and irritate the animal.

Various changes in the form, proportion, and the minor details of construction may be resorted to without departing from the principle or sacrificing any of the advantages of this invention.

Having thus described my invention, what I claim as new, and desire to secure by Letters Patent, is—

1. A driving-bit provided with an overdraw-check guard, said guard having a chin-bar formed integral therewith and provided with curved keepers at its upper ends and an overdraw-check bit adapted to move within the keepers, substantially as described.

2. An overdraw-check bit and guard therefor comprising a curved chin-bar having curved upper ends provided with slots or keepers, an overdraw-check bit adapted to move in said slots or keepers, and said check-guard being connected to a driving-bit, substantially as described.

3. In a driving-bit, curved snaffle-bars adapted to extend under the lower jaw of the horse and pivoted together at their inner ends, in combination with an overdraw-check guard and bit, said guard having a U-shaped chin-bar pivoted to the snaffle-bars, curved upper ends provided with slots or keepers and an overdraw-check bit adapted to move within the slots or keepers, substantially as described.

4. A bridle-bit provided with a mouth-bar, in combination with rein-rings and a U-shaped chin-bar pivotally connected to said mouth-bar, a curved overdraw-check guard provided with slots or keepers at its ends, and an overdraw bit moving within said keepers or slots, substantially as described.

In testimony whereof I have hereunto set my hand in presence of two subscribing witnesses.

GEORGE T. DUNCAN, Sr.

Witnesses:
- J. B. WARREN,
- I. B. PEMINGTON.